3,813,302
GRAIN-REFINING COMPOUNDS
Alexander Robley Morrison, Flat 8, 594 Inkerman Road,
Caulfield, Victoria, Australia
No Drawing. Filed Nov. 2, 1971, Ser. No. 195,013
Claims priority, application Australia, Nov. 19, 1970,
3,250/70
Int. Cl. C23f 7/08
U.S. Cl. 148—6.15 R                 12 Claims

ABSTRACT OF THE DISCLOSURE

Novel improved compositions of titanium for use as grain-refining materials in zinc phosphating processes consist essentially of mixed orthophosphates of titanium and barium, strontium or calcium, which additionally form non-flocculated dispersions in water. The compositions may be prepared by a process in which titanium orthophosphate is precipitated in a dispersion of the divalent metal orthophosphate in water under specific limiting processing conditions. Alkaline metal-cleaning liquids containing the novel titanium compositions are also disclosed.

---

This invention relates to novel titanium grain-refining compounds for use in aqueous metal-cleaning liquids, to a process of preparing them and to aqueous metal-cleaning liquids comprising such novel compounds.

It is known that the corrosion resistance of ferrous and zinc-containing metal surfaces and the adhesion of paint films thereto can be usefully improved by depositing on them a crystalline zinc phosphate coating. The metal surfaces are usually pre-cleaned prior to phosphating to remove from them contaminants such as oil, grease and dirt, for which purpose an aqueous, mildly alkaline cleaning liquid is commonly used.

However, unless special precautions are taken to avoid it, the phosphate coating deposited on metal surface so-cleaned tends to form as a mass of relatively coarse, loosely packed crystals. A coating with these characteristics usually has poor adhesion to the metal and has the further disadvantage that it will disrupt and mar the appearance of an otherwise glossy paint film applied over it.

It has been proposed that when certain phosphates of titanium known broadly in the art as titanium grain-refining compounds are added to the cleaning liquid, the subsequently applied zinc phosphate coating will be denser, more finely crystalline and more tightly adherent to the metal surface than would be the case in their absence. The corrosion resistance of such surfaces is also considered to be superior to that of a metal surface coated with a coarser, less dense zinc phosphate deposit. Grain-refining compounds of this class are typified by the so-called "Jernstedt" salts described, for example, in Australian patent specification No. 224,761 and U.S. patent specification No. 2,310,239. Although the precise nature of these salts is not defined, they would appear to be complex salts of titanium which exist in the cleaning liquid as finely dispersed solids and are said to provide a source of titanium ions in the liquid.

We have observed that once known titanium grain-refining compounds are added to a metal-cleaning liquid the ability of that liquid to display a grain-refining function usually diminishes with time, even when the liquid is not in use. For convenience hereinunder, but without ascribing any particular scientific mechanism to the effect we have observed, we refer to it as "decay" of the grain-refining compound. The rate of decay of known grain-refining compounds appears, in general to increase with increasing pH above a certain threshold value character-istic of the particular compound under test and to be accelerated by the presence in the liquid of a pyro- or tripoly-phosphate, for example tetra-sodium pyrophosphate and sodium tripolyphosphate; which are desirable constituents of certain metal-cleaning liquids. The rate of decay may be so rapid, especially in liquids of pH values above about 10, that for all practical purposes the addition of a conventional grain-refining compound to the liquid confers on it no useful grain-refining properties even when a freshly prepared liquid is tested.

We have now found that certain novel inorganic titanium compounds as hereinunder described can be used in place of known titanium grain-refining compounds to overcome certain of these disadvantages. Our novel compounds have a usefully slower rate of decay in high pH liquids and can exert a effective grain-refining influence in the presence of polyphosphates and pyrophosphates.

The novel titanium compositions we now disclose are broadly described as consisting essentially of mixed orthophosphates of titanium and the divalent metals barium, strontium and calcium, in which the number of equivalents of titanium present does not exceed the number of equivalents of the divalent metals. Surprisingly, however, we have discovered that compounds which have the above described advantages when used as grain-refining compounds cannot be categorized by these parameters alone. While the precise mode of action of these compounds is not understood it appears that some further characteristic thereof, possibly related to their physical structure, must be taken into account in adequately identifying them. We have found that this further essential requirement is satisfied by compositions of the above chemical type which additionally disperse readily in water to form substantially non-flocculated particulate dispersions therein. By substantially non-flocculated we mean that when a sample of the product is dispersed rapidly with stirring into a large excess of water, it forms a hazy dispersion therein with no obvious appearance of the presence of highly flocculated solid particles. It may be possible to detect some aggregation of ultrafine particles within individual disperse particles, but the overall appearance to the eye is of a dispersion recognizable to the art as being non-flocculated. By way of contrast, a titanium composition which does not have the characteristics we require displays the obvious and typical appearance, when so-tested, of flocs of solid particles suspended in an otherwise relatively clear liquid.

Accordingly, in the present invention we provide a novel composition of titanium consisting essentially of mixed orthophosphates of titanium and at least one divalent metal selected from barium, strontium and calcium in which the number of equivalents of titanium presents does not exceed the number of equivalents of the said divalent metal and further characterised in that the composition disperses readily in water to form a substantially non-flocculated particulate dispersion therein.

We further provide a process of preparing a novel composition of titanium by precipitating and dispersing titanium orthophosphate in a medium consisting essentially of water wherein is dispersed an orthophosphate of divalent metal selected from barium, strontium and calcium, provided also that the number of equivalents of titanium present does not exceed the number of equivalents of the said divalent metal, the total composition is essentially free of divalent anions and its water content is not permitted to exceed 40% by weight.

The presence of divalent anions, e.g. sulphate ions, prevents the formation of a composition which is readily dispersible in water to form a non-flocculated dispersion. Our experimental evidence suggests that even 0.5% by weight of divalent anions can defeat the successful performance of the process and while it may be possible to tolerate trace quantities of impurities of such ions in the process, as far as practicable we prefer to exclude them from the composition. In calculating the water content of the process there must be included therein any water introduced by the components as water of crystallization.

For the best results, the divalent metal orthophosphate should itself be dispersed in the water in the form of very fine disperse particles before precipitation therein of the titanium orthophosphate. While a suitable dispersion can be made from a preformed divalent metal orthophosphate, we have found that the most satisfactory approach is to precipitate the required orthophosphate *in situ* in the water from suitable reactants. Hence, in a preferred embodiment of our process both the titanium and divalent metal orthophosphate dispersion are prepared by precipitating the orthophosphate in the water.

The most satisfactory method we have devised for preparing the required orthophosphates by a precipitation method is to use a base-exchange reaction between a suitable compound of the desired metal and an alkali metal orthophosphate in aqueous solution. Bearing in mind that the reaction mixture must be essentially free of divalent ions, suitable titanium compounds are, for example, titanium chloride and potassium titanium fluoride. Corresponding divalent metal compounds are, for example, the chlorides and nitrates of barium, strontium and calcium. Alternatively the carbonates and hydroxides of the divalent metals may be used but these involve longer times and higher reaction temperatures, so in general we avoid using them. The divalent metals may be used alone or in combination in the titanium compositions.

The orthophosphate solution in which the base-exchange precipitation reaction is to be carried out may comprise a single orthophosphate, but for reasons which will be apparent hereinunder it will usually comprise a mixture of two or more alkali metal orthophosphates. Suitable materials are, for example, the mono-, di- and tri-sodium and potassium orthiophosphates. The phosphates may be used in their anhydrous or dehydrated form, together with the permitted limiting amount of water. There is no particular requirement to be met in selecting a suitable orthophosphate from which to prepare the divalent metal orthophosphate, but bearing in mind that titanium orthophosphate will usually be precipitated subsequently in the same environment we normally make our selection on the basis of the requirements of this stage of the process. We have found that the titanium orthophosphate precipitation process is most effectively carried out at a pH of about 6.7 to 7.2 (measured on a 30% by weight solution of the orthophosphates in water) and although a higher pH, e.g. up to about 7.9 may be used with less dependable results, the lower limit of 6.7 should not be exceeded. Our practice is, therefore, to select a mixture of alkali metal orthophosphates which give a pH within this region.

Taking into account the requirement to carry out a chemical reaction efficiently and the need to disperse the precipitated orthophosphates in the reaction mass, together with the maximum permissible water content, it is necessary to heat the mixture of orthophosphate sufficiently to provide a homogeneous liquid medium, as the initial stage of the preparation. An addition of water (but not in excess of the 40% weight limit) over that provided by any water of crystallization present may be made initially or at subsequent stages of the cycle to maintain fluidity of the medium. An addition of up to about 1.5% by weight of a dispersing agent, e.g. sodium hexametaphosphate, may also be made to assist with the dispersion of precipitated orthophosphate.

If the titanium composition is to be prepared using a preformed divalent metal orthophosphate, the water limitation on the overall composition dictates that this be dispersed, using conventionally a high-powered mechanical mixer provided with a heating source, in a mixture (usually of the consistency of a heavy paste) of water and the orthophosphate which will be used subsequently in the base-exchange reaction which provides precipitated titanium orthophosphate. When a homogeneous blend is obtained, the required amount of titanium compound to give the chosen ratio of titanium to divalent metal ion is added and agitation continued until the base-exchange reaction is completed. The process is essentially the same in principle when the divalent metal orthophosphate is to be precipitated *in situ* except that the requisite correct amount of alkali metal orthophosphate must be used initially in addition to the divalent metal compound, with the corresponding base-exchange reaction carried out first before precipitation of titanium orthophosphate commences.

Temperatures of the order of 60–65° C. are usually satisfactory for the precipitation of the divalent metal orthophosphates using their chlorides and nitrates. For the titanium orthophosphate reaction a temperature of the order of 80–85° C. is needed.

In a further preferred embodiment of our process, all of the ingredients are pre-mixed and the divalent metal orthophosphate and titanium orthophosphate selectively precipitated in that sequence by temperature control of the process. The temperature is first maintained at about 50°–60° C. until substantially all of the divalent metal orthophosphate has precipitated then raised to about 85° C. to precipitate the titanium orthophosphate. In this embodiment of our process the pH of the orthophosphate mixture should be held to the preferred limits of 6.7 to 7.2 when no significant quantities of titanium orthophosphate are formed at the lower reaction temperature. Some degree of selectivity of reaction may be retained at a pH as high as about 7.9, but for the best results we have found that the above pH limits should be adhered to.

The completed titanium composition is optionally at least partially dehydrated, allowed to solidify by cooling and crushed to a fine powder for incorporation in metal cleaning liquids.

Irregularities in processing are readily detected by rapidly dispersing a sample of the batch into a large excess of water and observing the nature of the dispersion so-formed, as described hereinabove. For example, a flocculated dispersion has been observed in this simple test when sulphate ions were deliberately introduced into the reaction medium, when the water content of the medium was increased to 50% by weight during the precipitation process and when, during the performance of the above-described preferred process the reaction temperature was caused to rise initially to 85° C, thus causing titanium orthophosphate to precipitate before substantially all of the divalent metal orthophosphate had precipitated.

As mentioned above, the number of equivalents of titanium present in the compositions must not exceed the number of equivalents of divalent metal. At higher concentrations of titanium, within the limitations imposed on the water content, we have found that the reactants tend to form a glutinous mass which, when dispersed in water, produces a highly flocculated system. Since the grain-refining power of these compounds appears to be directly related to their titanium content, we prefer to maintain the concentration therein near or at the maximum permitted ratio.

The aqueous metal-cleaning liquids in which these titanium compounds may be used are commonly alkaline. For example the liquid may consist essentially of an aqueous solution of alkali, for example, sodium and potassium carbonates, bicarbonates and hydroxides, at the concentration necessary to provide the desired pH. The pH of the alkaline cleaning liquid is typically greater than 9 and preferably, for rapid cleaning, greater than 11. Other materials, for example, polyphosphates (e.g. alkali metal pyrophosphates and tripolyphosphates), alkali metal silicates and anionic or non-ionic surface active agents are commonly added to the liquid, for example to enhance its detergent action.

The concentration of titanium compound to be used in the liquid is normally expressed in terms of the concentration of titanium it provides. While concentrations as low as 0.0005% by weight (based on Ti content) in the liquid may show grain-refining properties, the most useful working concentrations are of the order of 0.005% to 0.05% by weight.

The compound is added to the cleaning liquid in the form of a finely pulverised powder and stirred in to give a uniform distribution of particles.

The invention is illustrated by the following examples in which all parts are expressed by weight:

EXAMPLE 1

Preparation of a titanium grain-refining compound according to the invention from anhydrous metal salts.

The following mixture:

| | Parts |
|---|---|
| Sodium dihydrogen orthophosphate (anhydrous) | 26.30 |
| Trisodium orthophosphate (anhydrous) | 22.70 |
| Calcium nitrate (anhydrous) | 11.60 |
| Potassium titanium fluoride (anhydrous) | 6.25 |
| Water | 33.15 | was added to a steam jacked heavy duty sigma-bladed mixer (as described, for example, in "Chemical Engineers' Handbook," Perry, McGraw-Hill Book Co., 3rd edition, p. 1207), blended for 5 minutes and then heated to 55±3° C. with a lid in place on the mixer. Heating and mixing was continued at this temperature for a further 30 minutes to produce a milky paste comprising precipitated calcium orthophosphates, mechanically dispersed throughout the mixture.

The pH of the mixture was then checked and adjusted by the addition of a trace of nitric acid or sodium hydroxide solution as required to 7±0.2. The batch temperature was then raised to 80–85° C. over a period of 30 minutes, held at this temperature for a further 60 minutes and then substantially dehydrated by removing the mixer lid and holding at 100° C. for about 2 hours.

The cooled and solidified product was then ground to pass through a British Standard 410 screen.

The product dispersed readily in water to give a fine, non-flocculated suspension of solid particles.

EXAMPLE 2

Preparation of a titanium grain-refining compound according to the invention from hydrated metal salts.

A grain-refining compound was prepared by the general method of Example 1 but using the following reactants:

| | Parts |
|---|---|
| Trisodium phosphate (12·$H_2O$) | 60.00 |
| Sodium dihydrogen phosphate (anhydrous) | 30.50 |
| Potassium titanium fluoride (1·$H_2O$) | 3.15 |
| Calcium nitrate (4·$H_2O$) | 6.35 |

The product dispersed readily in water to give a fine, non-flocculated suspension of solid particles.

EXAMPLE 3

Preparation of titanium grain-refining compounds comprising barium and strontium according to the invention.

Two compositions, one comprising barium and the other strontium compounds, were prepared by the general method of Example 2 from the following formulae:

| | Parts | |
|---|---|---|
| | No. 1 | No. 2 |
| Trisodium orthophosphate (12·$H_2O$) | 59.75 | 60.55 |
| Sodium dihydrogen orthophosphate (anhydrous) | 30.20 | 30.50 |
| Potassium titanium fluoride (1·$H_2O$) | 3.15 | 3.20 |
| Barium nitrate (anhydrous) | 6.90 | |
| Strontium nitrate (anhydrous) | | 5.75 |

Both products dispersed readily in water to give fine-non-flocculated suspensions of solid particles.

EXAMPLE 4

Effect of processing variables on the properties of compositions according to Example 1.

Using the general preparative method of Example 1 as a basis, the following variations in processing conditions were investigated in separate experiments:

(a) reaction temperature held to 70° C. maximum after pH adjustment
(b) pH adjusted to 7.8
(c) pH adjusted to 6.5

The product of experiment (a) gave a highly flocculated dispersion in water while the products of experiments (b) and (c) gave partially flocculated dispersions. It was observed in particular that the results with experiment (b) were unpredictably variable, the products of successive repeat preparations showing widely differing degrees of flocculation when dispersed in water.

In a further experiment (d) the reaction steps were reversed by initially omitting the calcium nitrate (with a corresponding adjustment to hold the water content of the charge constant), reacting for 60 minutes at 80–86° C. and at pH 7±0.2, then adding the calcium nitrate and holding for a further 30 minutes at 55±3° C. The cooled and ground product produced a highly flocculated dispersion when added to water.

EXAMPLE 5

Effect of water content on the process.

An attempt was made to repeat Example 2 but with an adjustment to the formula to raise the total water content from 36.5% by weight of that example to 40.5% by weight.

The proportions of reactants used were:

| | Parts |
|---|---|
| Trisodium orthophosphate (12·$H_2O$) | 56.50 |
| Sodium dihydrogen orthophospate (anhydrous) | 28.60 |
| Potassium titanium fluoride (1·$H_2O$) | 3.00 |
| Calcium nitrate (4·$H_2O$) | 5.95 |
| Water | 5.95 |

The reactants formed a thick gel at 77° C. which was difficult to mix satisfactorily in the equipment used. On dehydrating, cooling and grinding according to Example 2 a product was produced which dispersed in water but gave a highly flocculated suspension of solid particles.

EXAMPLE 6

Effect of titanium content on the compositions of the invention.

Example 2 was repeated but with an adjustment to the relative proportions of potassium titanium fluoride and calcium nitrate to raise the number of equivalents of calcium; that is to provide a composition lying outside of the compositions of the invention.

The proportions of reactants used were:

| | Parts |
|---|---|
| Trisodium orthophosphate (12·$H_2O$) | 60.70 |
| Sodium dihydrogen phosphate (anhydrous) | 30.70 |
| Potassium titanium fluoride (1·$H_2O$) | 3.20 |
| Calcium nitrate (4·$H_2O$) | 5.40 |

The mixture had similar unfavorable processing and flocculating characteristics to that of Example 5.

EXAMPLE 7

Preparation of "control" compositions comprising titanium orthophosphates, not according to the invention.

A series of compositions was prepared by the general method of Example 2 but replacing the calcium nitrate of that example with an equivalent weight of calcium sulphate, aluminium chloride, zinc nitrate, lead nitrate, ferric chloride, cadmium nitrate, chromium nitrate and copper chloride respectively. A further composition was prepared according to Example 1 but with the addition to it of 1.0 part of sodium sulphate.

All of the powdered compositions were readily dispersible in water but the dispersed particles were flocculated. The compositions comprising sulphates flocculated very rapidly.

EXAMPLE 8

Comparative grain-refining tests on titanium compounds incorporated in alkaline metal-cleaning liquids.

The following basic formula was used to prepare a series of alkaline metal-cleaning liquids in which the titanium compound is identified by reference to Table 1.

A dry blend of the following mixture was prepared:

|  | Parts |
|---|---|
| Sodium hydroxide | 25.0 |
| Sodium carbonate | 60.0 |
| Non-ionic surfactant | 8.0 |
| Titanium compound | 7.0 |
| Polymeric stabilizer | 3.0 |

The non-ionic surfactant used was a commercial octyl phenol/ethylene oxide condensate containing approximately 11 ethylene oxide units per phenol molecule. The polymeric stabiliser was a copolymer (approx. 1:1 molar ratios) of maleic anhydride and methyl vinyl ether which had a viscosity, as a 4% by weight solution in aqueous sodium hydroxide solution of pH 9 of 200 centipoise at 25° C.

The dry mix was stirred into water heated to 72° C. at a concentration by weight of 0.4% to give an alkaline cleaning liquid of pH greater than 12.

The cleaning liquids were tested by the following method. Rolled sheet panels coated with a heavily soiled oily film were sprayed with cleaning liquid at a pressure of 20 p.s.i. for one minute, rinsed with a spray of clean water for one minute, then sprayed for one minute with a commercial zinc phosphating solution of the type described in Australian patent application No. 9,478/66.

The zinc phosphating solution was prepared as a concentrate according to the following formula:

|  | Parts by wt. |
|---|---|
| Zinc oxide | 10.73 |
| 75% orthophosphate acid | 47.36 |
| Sodium chlorate | 5.83 |
| Water (to make) | 100.00 |

The concentrate was prepared by dissolving the zinc oxide in the phosphoric acid, adding the water to cool the solution to about 38° C. and then finally adding the sodium chlorate.

This concentrate was then broken down for use by dissolving 3040 gm. thereof in 100 litres of water then adding an additional 150 gm. of sodium chlorate and 12 gm. of sodium nitrite. The pH of the liquid was adjusted with sodium hydroxide to within the pH limits of 2.5 to 3.5 and used at a temperature of 60° C.

The panels were then air dried and examined visually for cleanliness and by microscopy to determine the nature of the coating found on them. All of the liquids cleaned the steel panels satisfactorily. The results of the grain-refining tests were as follows:

| Liquid No. | Titanium compound | | | Nature of phosphate coating |
|---|---|---|---|---|
|  | Ex. No. | Divalent metal | Processing variable |  |
| 1 | 1 | Calcium | | F.E. |
| 2 | 2 | do | | F.E. |
| 3 | 3 | Barium | | F.E. |
| 4 | 3 | Strontium | | F.E. |
| 5 | 4(a) | Calcium | Low reaction temperature | T.C. |
| 6 | 4(b) | do | pH 7.8 | T.C. |
| 7 | 4(c) | do | pH 6.5 | T.C. |
| 8 | 4(c) | do | Titanium reacted first | T.C. |
| 9 | 5 | do | High water content | T.C. |
| 10 | 6 | do | High titanium content | T.C. |
| 11 | 7 | do | Sulphate source | T.C. |
| 12 | 7 | Aluminium | | T.C. |
| 13 | 7 | Zinc | | T.C. |
| 14 | 7 | Lead | | T.C. |
| 15 | 7 | Iron | | T.C. |
| 16 | 7 | Cadmium | | T.C. |
| 17 | 7 | Chromium | | T.C. |
| 18 | 7 | Copper | | T.C. |
| 19 | 7 | Calcium | Added sulphate | T.C. |
| 20 | | Nil | | T.C. |

NOTE.—F.E.=fine-grained, even, continuous coating; T.C.=thin, coarsely crystalline, uneven and powdery.

The titanium compound used in liquid No. 20 was a conventional titanium grain-refining compound essentially free of other polyvalent metals, available commercially, but prepared according to Australian patent specification No. 224,761.

The results show that at the pH of these cleaning liquids only the titanium compounds comprising barium, strontium or calcium exerted a grain-refining action during the subsequent phosphate coating process. Furthermore, in order to develop a useful grain-refining capacity, it was necessary to prepare these compounds in such a way that they were dispersible in water in a non-flocculated state.

EXAMPLE 9

Comparative grain-refining tests on titanium compounds incorporated in alkaline metal-cleaning liquids comprising alkali metal silicate and pyrophosphate.

The procedures of Example 8 were repeated but with the substitution of the following general formula for the dry blend of that example:

|  | Parts |
|---|---|
| Sodium orthosilicate | 43.0 |
| Tetra-sodium pyrophosphate | 22.0 |
| Sodium carbonate | 16.0 |
| Non-ionic surfactant (as Example 8) | 8.0 |
| Titanium compound | 8.0 |
| Polymeric stabiliser (as Example 8) | 3.0 |

The results of the tests were in direct agreement with those of Example 8.

EXAMPLE 10

Preparation of a titanium grain-refining composition from preformed calcium orthophosphate.

A titanium composition was prepared by the general method of Example 1, but with the following modifications. The calcium nitrate was replaced by a commercial grade of calcium orthophosphate at constant calcium content and with a reduction in the sodium orthophosphates content based on the chemical equivalents of orthophosphate previously consumed in the base-exchange reaction with the calcium nitrate. The grade of calcium phosphate selected was described as "precipitated" and when stirred into a large excess of water it formed a milky suspension which showed little tendency to settle in 8 hours. The ingredients were otherwise processed as in Example 1.

The grain-refining compound so-produced showed a very slight tendency to flocculate when stirred into a large excess of water, but when tested by the method of Example 8 it exhibited a good grain-refining capacity as judged by the fineness of the zinc phosphate coating produced by that test. The performance of this compound was judged to be slightly inferior to that of the composition of Example 1, which we attribute to the finer texture of the material made from a calcium phosphate precipitated *in situ* in the process.

EXAMPLE 11

Comparison of the effective working life of titanium-containing alkaline metal-cleaning liquids using titanium grain-refining compounds both of conventional type and according to this invention.

Two metal-cleaning liquids were prepared according to the formula of Example 9, using the titanium compound according to Example 1 in the first and a conventional titanium grain-refining compound not incorporating an orthophosphate of barium, strontium or calcium, in the other (control).

A simulated commercial metal treatment line was set up in which mild steel panels were continuously cleared, rinsed and zinc phosphate coated in known conventional manner. Steel panels were fed through the line, half of the panels being cleaned in the liquid containing titanium grain-refining compound from Example 1 and half through the control cleaner. The condition of the phosphate coating on the panels was monitored and the level of liquid in the cleaning stages kept topped up to a constant volume.

After 36 hours the panels pre-cleaned in the control liquid were producing thin, coarsely crystalline phosphate coatings. There was no significant deterioration in quality of the panels cleaned in the other bath even after 72 hours. This test confirmed the superior resistance to decay of the grain-refining capacity of the liquid containing grain-refining compound according to the invention.

I claim:

1. A composition of titanium consisting essentially of mixed orthophosphates of titanium and at least one divalent metal selected from barium, strontium and calcium in which the number of equivalents of titanium present does not exceed the number of equivalents of the said divalent metal and further characterized in that the composition disperses readily in water to form a substantially non-flocculated dispersion therein.

2. A process of preparing a composition of titanium by precipitating and dispersing titanium orthophosphate in a medium consisting essentially of an orthophosphate of a divalent metal selected from the group of barium, strontium and calcium dispersed in water, wherein the number of equivalents of titanium present does not exceed the number of equivalents of said divalent metal, and wherein the total composition is essentially free of divalent anions and has a water content that does not exceed 40% by weight.

3. A process according to claim 2 in which the divalent metal orthophosphate is precipitated in water by a base-exchange reaction between a compound of the divalent metal and an alkali metal orthophosphate.

4. A process according to claim 3 in which the compound of the divalent metal is selected from the carbonates, chlorides, hydroxides and nitrates of barium, strontium and calcium and the alkali metal orthophosphate is selected from the mono-, di-, and tri-sodium and potassium orthophosphates.

5. A process according to claim 2 in which the titanium orthophosphate is precipitated in the medium by a base-exchange reaction between a titanium compound and alkali metal phosphate and at pH of at least 6.7, as measured on a 30% by weight solution in water of the said alkali metal orthophosphate.

6. A process according to claim 5 in which the titanium compound is potassium titanium fluoride and the alkali metal orthophosphate is selected from the mono-, di- and tri-sodium and potassium orthophosphates.

7. A process of preparing a novel composition of titanium in which a paste consisting essentially of (a) water, (b) alkali metal orthophosphate, and (c) a titanium compound and a compound of divalent metal selected from barium, strontium and calcium which will undergo a base-exchange reaction with alkali metal orthophosphate, is mechanically agitated and maaintained at a temperature of about 50–60° C. until substantially all of the divalent metal is precipitated as orthophosphate and then heated to about 85° C. until the titanium is precipitated as orthophosphate, further characterized in that the orthophosphate has a pH of at least 6.7 when tested as a 30% by weight solution in water, the number of equivalents of titanium present does not exceed the number of equivalents of the said divalent metal, the total composition is essentially free of divalent anions and its water content is not permitted to exceed 40% by weight.

8. A process according to claim 7 in which the pH of the mixture is adjusted to 6.7 to 7.2 before the temperature is raised to about 85° C.

9. A process according to claim 7 in which the titanium compound is potassium titanium fluoride, the alkali metal orthophosphate is selected from the mono-, di- and tri-orthophosphates of sodium and potassium and the compound of divalent metal is selected from the chlorides and nitrates of barium strontium and calcium.

10. A process according to claim 7 in which the composition of titanium is at least partially dehydrated, allowed to solidify by cooling and pulverized to a fine powder.

11. In an aqueous alkaline liquid for use as a grain-refining metal cleaner comprising an aqueous solution of alkali, the improvement whereby the aqueous alkaline liquid consists essentially of an aqueous solution of alkali of pH greater than 9 and a composition of titanium consisting essentially of mixed orthophosphates of titanium and at least one divalent metal selected from barium, strontium and calcium in which the number of equivalents of titanium present does not exceed the number of equivalents of the said divalent metal and further characterized in that the composition disperses readily in water to form a substantially non-flocculated dispersion therein, the titanium content expressed as Ti being at least 0.0005% by weight.

12. The aqueous alkaline liquid according to claim 11 wherein the alkali is selected from the group consisting of carbonates, bicarbonates and hydroxides of sodium and potassium.

References Cited

UNITED STATES PATENTS

| | | | |
|---|---|---|---|
| 2,337,856 | 12/1943 | Rice et al. | 148—6.15 R |
| 2,874,081 | 2/1959 | Cavanaugh et al. | 148—6.15 Z |
| 2,490,062 | 12/1949 | Jernstedt | 148—6.15 R |
| 2,939,772 | 2/1960 | Newman et al. | 252—156 |
| 2,516,008 | 7/1950 | Lum | 252—135 |
| 2,743,205 | 4/1956 | Condon | 106—14 |
| 3,007,817 | 11/1961 | Cavanaugh et al. | 148—6.15 Z |

ALFRED L. LEAVITT, Primary Examiner

C. WESTON, Assistant Examiner

U.S. Cl. X.R.

106—3, 14; 252—156